(12) United States Patent  
Lagerberg

(10) Patent No.: US 6,471,448 B1
(45) Date of Patent: Oct. 29, 2002

(54) CUTTING TOOL HAVING LIQUID-SPRAYING NOZZLES FOR CONTROLLING CHIP FORMATION

(75) Inventor: Stig Lagerberg, Sandviken (SE)

(73) Assignee: Sandvik Aktiebolag, Sandviken (SE)

( * ) Notice: Subject to any disclaimer, the term of this patent is extended or adjusted under 35 U.S.C. 154(b) by 111 days.

(21) Appl. No.: 09/654,989

(22) Filed: Sep. 5, 2000

(30) Foreign Application Priority Data

Sep. 2, 1999 (SE) .............................. 9903101

(51) Int. Cl.$^7$ .................. B23B 27/00; B23B 27/22
(52) U.S. Cl. .................. 407/2; 407/5; 407/11
(58) Field of Search .................. 407/2, 3, 4, 5, 407/6, 11, 114, 120

(56) References Cited

U.S. PATENT DOCUMENTS

| 3,563,324 | A | * | 2/1971 | Lauber | 175/393 |
| 5,148,728 | A | * | 9/1992 | Mazurkiewicz | 82/1.11 |
| 5,272,945 | A | * | 12/1993 | Lockard | 82/1.11 |
| 5,288,186 | A | * | 2/1994 | Kovacevic | 409/131 |
| 5,358,360 | A | * | 10/1994 | Mai | 408/61 |
| 5,388,487 | A | * | 2/1995 | Danielsen | 82/158 |

FOREIGN PATENT DOCUMENTS

| WO | 99/39852 | 8/1999 |
| WO | 99/39853 | 8/1999 |

OTHER PUBLICATIONS

U.S. patent application Ser. No. 09/600,922, Lagerberg, filed Sep. 8, 2000.

* cited by examiner

Primary Examiner—Henry Tsai
(74) Attorney, Agent, or Firm—Burns, Doane, Swecker & Mathis, LLP

(57) ABSTRACT

A metal workpiece is cut by rotating the workpiece while pressing the cutting edge of a cutting insert thereagainst for removing a chip from the workpiece. A first liquid jet is directed from a first nozzle toward an upper surface of the cutting insert for creating an hydraulic wedge between the cutting insert and the chip, and a second liquid jet is directed from a second nozzle toward a target point disposed above the upper surface of the cutting insert to engage and deflect the chip upwards and backwards.

11 Claims, 1 Drawing Sheet

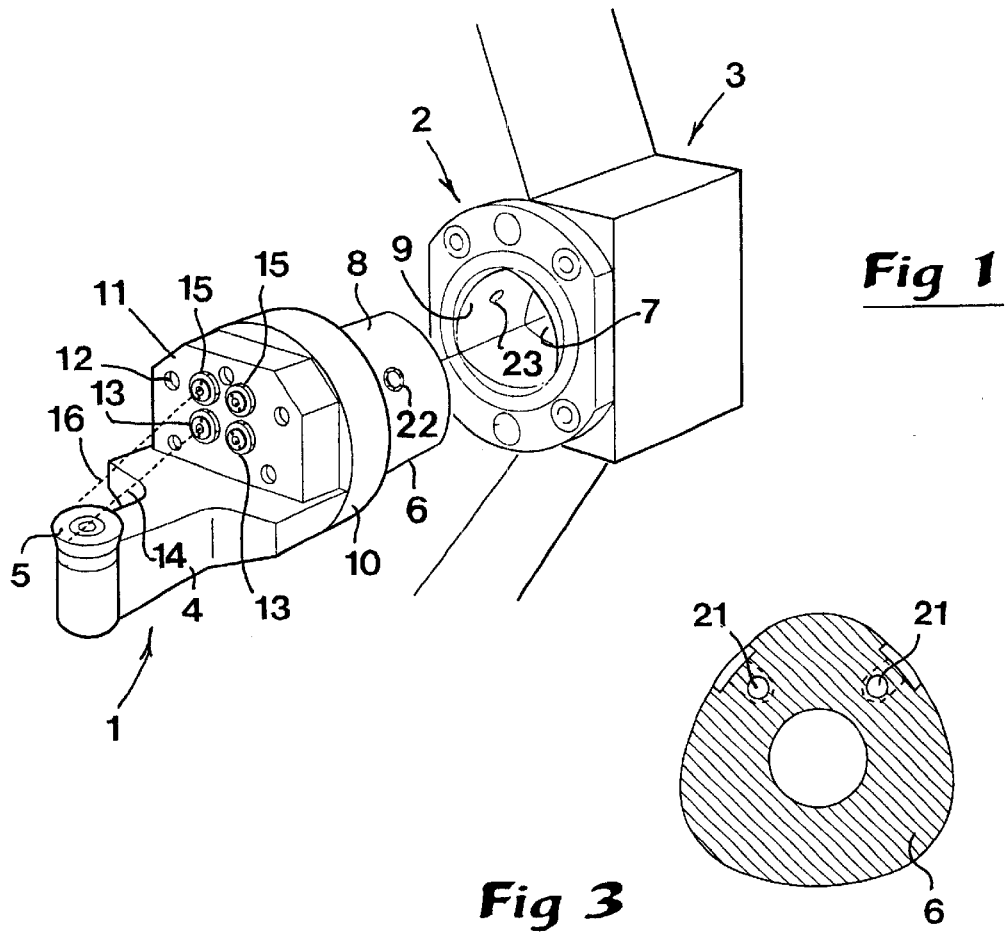
*Fig 1*
*Fig 3*
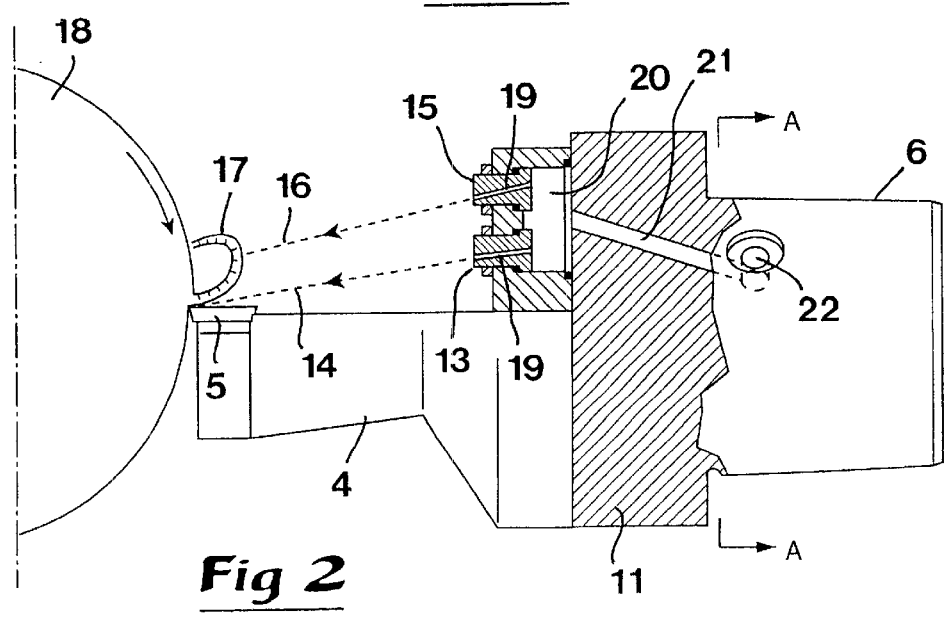
*Fig 2*

CUTTING TOOL HAVING LIQUID-SPRAYING NOZZLES FOR CONTROLLING CHIP FORMATION

TECHNICAL FIELD OF THE INVENTION

This invention relates to a cutting tool including a tool body with, on the one hand, a front part for holding a cutting insert and, on the other hand, a rear part, which houses a plurality of nozzles. The nozzles are supplied with pressurized cooling liquid from an external liquid supply source via a duct system inside the tool body for the purpose of spraying a high pressure cooling liquid jet towards the area of an upper surface on the cutting insert in a manner forming an hydraulic wedge between the upper surface of the cutting insert and a chip emanating from a workpiece, in order to lift and distance the chip from the cutting insert.

GENERAL BACKGROUND OF THE INVENTION AND PRIOR ART

It is a common practice to cool not only the cutting inserts of cutting tools, e.g. Tools for turning, but also to cool the workpiece (which commonly comprises metal which is to be machined by the tool), as well as to cool the chips which are cut from the workpiece. A fundamental aim in today's technology for cutting or chip removing machining is to enable the use of as high a pressure as possible in the cooling liquid and to supply this in the form of one or more thin jets confined tightly together which generally are directed towards the cutting insert and the chip cut thereby. The higher the jet pressure, the greater are the possibilities to use the liquid jet in an advantageous way, not only for pure cooling, but also for mechanically affecting the chip cut from the workplace, by applying a force from the jet to the chip, more precisely with the purpose of breaking this chip into smaller pieces and/or guiding the chip away from the tool in a controlled way. Among those skilled in the art, there are different opinions as to what, in this connection, is to be regarded as low and high liquid pressure, respectively. Generally, the classification can, however, be made in following ranges:

Low pressure<10 bar,

Intermediate pressure 10–100 bar, and

High-pressure>100 bar.

On older cutting tools, cooling always took place using low pressure cooling liquid, while cutting tools according to somewhat more recent technology have worked with an intermediate pressure cooling liquid. In the more modem technology, liquid pressure of hundreds of bar are sometimes used.

When the cutting insert on a cutting tool, used for, for instance for turning, cuts a chip free from a rotating workpiece, commonly formed of metal, considerable amounts of heat are developed. The cutting of the chip is carried out in a primary shear zone, which is developed in a peripheral portion of the workpiece and extends obliquely upwards/backwards from the cutting edge of the cutting insert. By virtue of the high temperatures which are developed not only in the chip and the workpiece, but also in the cutting insert, the chip separated in the primary shear zone may not slide forward in a manner which is frictionless and without resistance along the upper surface of the cutting insert. On the contrary, the very hot chip may adhere to the upper surface of the cutting insert along a certain contact length in a manner similar to welding. The contact length may, depending on, for instance, the material of the workpiece, vary between tenths of a millimeter and approximately one millimeter extending backwards from a support zone near the cutting edge. In this connection, the hot chip material adheres powerfully as a thin layer above which the real separation of the chip takes place by shearing in a secondary shear zone (frequently called a weld zone). After this, a so called friction zone follows along which the chip is in strong friction contact with the cutting insert before leaving the cutting insert. In order to facilitate the separation of the chip from the cutting insert, most often some form of chip deflector is arranged; e.g. in the form of beads or projections on the upper surface of the cutting insert and/or in the form of special elements on the tool, in particular clamps for retention of the cutting insert.

The modem high pressure cooling liquid technology aims at directing the cooling liquid jet into the substantially wedge-shaped space which is provided between the underside of the chip and the upper surface of the cutting insert at the point where the chip is distanced initially from the cutting insert. The intention is to form a so called hydraulic wedge between the chip and the upper surface of the cutting insert, which wedge should contribute to breaking up the chip and, as far as possible, to reduce the contact length of the chip along the cutting insert. A significant aim associated with introducing high pressure cooling liquid between the chip and the cutting insert is, of course, also to cool the chip and insert as effectively as possible, A cutting insert intended for chip removing machining is previously known from WO 99/39853, which cutting insert has a chip deflector in the form of a number of small projections which are mutually spaced-apart by means of grooves into which high pressure cooling liquid may be injected with the purpose of shortening the contact length of the chip along the upper surface of the cutting insert. By means of these grooves, the high pressure cooling liquid may better penetrate beneath the chip at the same time as the surrounding projections aim at breaking up the chip in order to force the chip to deflect upwards/backwards as far as possible. Although this known cutting insert considerably improves the cooling and chip breaking effect in relation to older technology, no radical deflection of the chip in an upwards direction is effected. On the contrary, the chip tends to leave the upper surface of the cutting insert at a comparatively flat angle. This is something that in practice means that the chip may develop as a tangled skein.

OBJECTS AND FEATURES OF THE INVENTION

The present invention aims at obviating the above-mentioned shortcomings in the previously known technology and at providing a cutting tool with an improved ability to control the chip, which has been cut free. Therefore, a primary object of the invention is to provide a cutting tool, which not only guarantees a good cooling but also an improved chip breaking ability.

One aspect of the invention relates to a cutting tool which comprises a front body part that forms a seat adapted to receive a cutting insert, a rear body part adapted to be detachably secured in a holder, and a plurality of liquid nozzles disposed rearwardly of the seat for emitting high pressure liquid jets. A first of the nozzles is arranged to direct its liquid jet toward a first target point for creating an hydraulic wedge between a cutting insert and a chip formed by the cutting insert. A second of the nozzles is arranged to direct its liquid jet toward a second target point disposed above the first target point for deflecting the chip upwards and backwards.

The invention also pertains to a metal cutting apparatus which includes the above-described metal cutting tool and a clamping unit in which the cutting tool is mounted.

Yet another aspect of the invention relates to a method of cutting a metal workpiece using a cutting insert, wherein a first liquid jet is directed from a first nozzle toward an upper surface of the cutting insert for creating an hydraulic wedge between the cutting insert and the chip, and a second liquid jet is directed from a second nozzle toward a target point disposed above the upper surface of the cutting insert to engage and deflect the chip upwards and backwards.

BRIEF DESCRIPTION OF THE APPENDED DRAWING

FIG. 1 is a perspective exploded view showing a cutting tool according to the invention adjacent to a partially outlined machine for chip removing machining;

FIG. 2 is a partial sectioned side view showing the tool during machining of a workpiece; and FIG. 3 is a cross-section A—A in FIG. 2.

DETAILED DESCRIPTION OF THE PREFERRED EMBODIMENT OF THE INVENTION

In the drawing, a cutting tool is generally designated 1, which in the example is included in a so-called modular tool system and co-operates with a clamping unit 2. This clamping unit is fixedly assembled in a machine 3 outlined only partially, which is represented by a portion of a turret plate.

The cutting tool 1 includes a front part 4 with a detachable cutting insert 5, which in the example is in the form of a round cutting insert. A rear part 6 of the cutting tool is in the shape of a male element, which is insertable in a cavity 7 in the clamping unit 2. The coupling between the cutting tool and the clamping unit may advantageously be of the COROMANT CAPTO® type, the male element 6 as well as the cavity 7 having a polygonal, although softly rounded cross-section shape, which tapers in the backward direction. In the area of the interior of the cavity 7, there is a clamping mechanism (not shown) which may be brought to engagement with coupling means (not shown) inside the male element 6 with the purpose of, on the one hand, pulling in and fixing the male element in the cavity during assembly, and, on the other hand, ejecting the same at disassembly. The envelope surface on the male element 6 is designated 8, while the interior surface defining the cavity 7 is designated 9.

The front and rear parts 4, 6 of the cutting tool 1 are spaced apart by a transverse, plate-shaped intermediate part 10 on the front side of which a detachable nozzle plate 11 is applied. It should here be pointed out that the parts 4, 6 and 10 are included in an integrated, solid one-piece body of metal. The plate 11 is kept fixed against the plate part 10 by means of screws (not shown), which are fastened in holes 12. A plurality of nozzles, of which two are designated by numeral 13, are mounted in the plate 11. These nozzles 13 have the purpose of spraying high pressure cooling liquid jets 14 towards the cutting insert 5, more precisely towards a first target point defined by the upper surface of the cutting insert in an area near the cutting edge of the cutting insert.

As far as the tool shown in the drawing has been described hitherto, the same is in all essentials previously known from disclosed technology, e.g. such as this is represented by WO 99/39852 (filed at the same time as the above-mentioned WO 99/39853).

Characteristic of the invention is that the nozzle plate 11 in addition to the first mentioned nozzles 13 also includes second nozzles 15. Each second nozzle 15 cooperates with one of the first nozzles 13 to form a pair of nozzles 13, 15. More precisely, the second nozzle 15 in each such pair of nozzles directs a second high pressure cooling liquid jet 16 towards a chip 17 which is released from a workpiece 18 and which is already cooled per se by the first liquid jet 14. In the example according to FIG. 2, said workpiece is submitted to a turning operation during which the same is brought to rotate. Each second nozzle 15 is placed preferably above a co-operating first nozzle 13 of the respective nozzle pair, which nozzle 13 directs the jet 14 thereof towards the cutting edge of the cutting insert in order to form an hydraulic wedge between the upper surface of the cutting insert and the initially formed chip 17. In this connection, the second nozzle 15 is adjusted in such a way that the appurtenant jet 16 is directed towards a second target point at a level above the cutting insert in order to meet the chip 17 initially distanced from the cutting insert and thereby applying to this chip a mechanical force which tends to deflect the chip in a direction upwards/backwards, i.e., upwards and to the left as is illustrated in FIG. 2.

In the preferred embodiment shown in the drawing, each second nozzle 15 in the two pairs of co-operating nozzles is placed above the appurtenant first nozzle 13 in a vertical plane passing through the appurtenant first nozzle 13. Alternatively, other arrangements are possible. For example, it is feasible to locate the second nozzle at a point located above the first nozzle 13 but offset from a vertical plane passing through the first nozzle. Thus, what is essential is that the bore 19 of the nozzle 15 is adjusted in such a way that the jet 16 will meet the chip 17 at a suitable level above the cutting insert and above the hydraulic wedge which is formed by the jet 14.

The nozzles 13 as well as the nozzles 15 may be of the type described in WO 99/39852, i.e. They could be adjustable in order to enable fine adjustment of the point of impact of the liquid jet in question. However, it would be feasible to use fixed nozzles of a simpler type, i.e. nozzles having a jet direction which is set permanently at the time of manufacture of the nozzle plate. As may be seen in FIG. 2, the inlet ends of two nozzles 13, 15 of each cooperating pair of nozzles are connected with one of two spaces 20 formed in the rear side of the nozzle plate 12 (only one space 20 depicted). High pressure cooling liquid is fed to these spaces 20 via respective ducts 21, which intersect the envelope surface 8 at a common port 22. When the male element 6 is fixed in the clamping unit 2, the port 22 is located opposite a port 23 created by a duct located inside the clamping unit, which duct intersects the interior surface 9 of the cavity 7. This duct, in turn, is connected in a suitable way to an external cooling liquid supply source, which has the ability to pressurize the cooling liquid to a very high pressure (e.g. within the range of 500–1500 bar, or more). The ports 22, 23 extend radially in order to transmit, between the clamping unit and the male element of the tool, the high pressure cooling liquid in the radial direction with the purpose of preventing the tool from being exposed to axial forces which would tend to eject the tool out of the clamping unit.

In the embodiment example shown, the tool includes two pairs of lower and upper nozzles. Each of these nozzle pairs is supplied with liquid by a respective duct 21 that vents into one of the two spaced-apart collecting spaces 20. In this way, one of the nozzle pairs may be shut down when the other is operating. However, it would also be feasible to connect all nozzles with a common collecting space which is supplied by only one liquid duct. In such cases, all nozzles will simultaneously spray jets towards the cutting insert and the chip, respectively.

By guaranteeing a spraying, according to the invention, of not only a first jet for forming an hydraulic wedge between the upper surface of the cutting insert and the chip, but also a second jet with a higher point of impact, the situation is attained where the chip, after having had an advantageously short contact length along the cutting insert, will be deflected upwards/backwards in a considerably more efficient way than in previously known tools. The distinct upwards deflection of the chip causes the chip to be deflected inwards to the workpiece to facilitate breaking of the chip into smaller pieces. In other words, the emergence of a tangled skein of chips, which is difficult to control during practical operation, is counteracted.

Although the present invention has been described in connection with a preferred embodiment thereof, it will be appreciated by those skilled in the art that additions, deletions, modifications, and substitutions not specifically described may be made without departing from the spirit and scope of the invention as defined in the appended claims.

What is claimed is:

1. A cutting tool comprising:
    a front body part forming a seat adapted to receive a cutting insert;
    a rear body part adapted to be detachably secured in a holder; and
    a plurality of liquid nozzles disposed rearwardly of the seat for emitting liquid jets at a pressure greater than 100 bar, a first of the nozzles arranged to direct its liquid jet toward a first target point for creating a hydraulic wedge between a cutting insert and a chip formed by the cutting insert, and a second of the nozzles arranged to direct its liquid jet toward a second target point disposed above the first target point for deflecting the chip upwards and backwards.

2. The cutting tool according to claim 1 wherein the second nozzle is disposed above the first nozzle.

3. The cutting tool according to claim 2 wherein the first and second nozzles communicate with a common cavity that is supplied with pressurized liquid from a source external to the cutting tool.

4. The cutting tool according to claim 3 wherein the nozzles are mounted in an intermediate body part situated between the front and rear body parts, the common cavity disposed in the intermediate body part.

5. The cutting tool according to claim 1 wherein the first and second nozzles communicate with a common cavity that is supplied with pressurized liquid from a source external to the cutting tool.

6. The cutting tool according to claim 5 wherein the nozzles are mounted in an intermediate body part situated between the front and rear body parts, the common cavity disposed in the intermediate body part.

7. A metal cutting apparatus comprising:
    a clamping unit including a cavity and a first liquid duct intersecting an interior surface of the cavity; and
    a cutting tool including:
        a rear body part mounted in the cavity,
        a front body part forming an insert seat in which a cutting insert is mounted,
        an intermediate body part disposed between the front and rear body parts,
        a pair of first and second liquid nozzles mounted in the intermediate body part for emitting respective liquid jets at a pressure greater than 100 bar, the first nozzle arranged to direct its liquid jet toward a first target point disposed on an upper surface of the cutting insert for creating an hydraulic wedge between the cutting insert and a chip formed thereby, the second nozzle arranged to direct its liquid jet toward a second target point disposed above the first target point for deflecting the chip upwards and rearwards, and
        a second liquid duct aligned with the first liquid duct and communicating with the nozzles for transmitting high-pressure liquid to the nozzles.

8. The apparatus according to claim 7 wherein the second nozzle is disposed above the first nozzle.

9. A method of cutting a metal workpiece using a cutting insert, comprising the steps of:
    A. rotating the workpiece with a cutting edge of the cutting insert pushed thereagainst for removing a chip from the workpiece;
    B. directing a first liquid jet from a first nozzle toward an upper surface of the cutting insert for creating an hydraulic wedge between the cutting insert and the chip, during step A; and
    C. directing a second liquid jet from a second nozzle toward a target point disposed above the upper surface of the cutting insert to engage and deflect the chip upwards and backwards, during steps A and B.

10. The cutting tool according to claim 1 wherein the pressure is greater than 500 bar.

11. The apparatus according to claim 7 wherein the pressure is greater than 500 bar.

* * * * *